United States Patent
Yu

(10) Patent No.: US 11,859,586 B2
(45) Date of Patent: Jan. 2, 2024

(54) METHOD AND SYSTEMS FOR A DIRECT FUEL INJECTION INJECTOR

(71) Applicant: SAUDI ARABIAN OIL COMPANY, Dhahran (SA)

(72) Inventor: Xin Yu, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/244,118

(22) Filed: Apr. 29, 2021

(65) Prior Publication Data

US 2022/0349369 A1 Nov. 3, 2022

(51) Int. Cl.
| | |
|---|---|
| *F02M 61/10* | (2006.01) |
| *F02M 61/18* | (2006.01) |
| *F02B 17/00* | (2006.01) |
| *F02M 53/08* | (2006.01) |

(52) U.S. Cl.
CPC ........... *F02M 61/10* (2013.01); *F02B 17/005* (2013.01); *F02M 53/08* (2013.01); *F02M 61/1806* (2013.01); *F02B 2275/14* (2013.01); *F02M 2700/4359* (2013.01); *F02M 2700/4361* (2013.01)

(58) Field of Classification Search
CPC ... F02B 17/005; F02B 2275/14; F02M 53/08; F02M 61/10; F02M 61/18; F02M 61/1806; F02M 2700/4359; F02M 2700/4361
See application file for complete search history.

(56) References Cited

U.S. PATENT DOCUMENTS

| | | | |
|---|---|---|---|
| 4,406,404 A | 9/1983 | Horino et al. | |
| 4,566,634 A | 1/1986 | Wiegand | |
| 4,595,144 A | 6/1986 | Wiegand et al. | |
| 5,586,726 A * | 12/1996 | Furuya | F02M 61/1813 239/545 |
| 10,502,171 B2 * | 12/2019 | Mulye | F02M 61/1813 |
| 10,927,739 B2 * | 2/2021 | Shaull | F01N 3/2892 |
| 2016/0097360 A1 | 4/2016 | Mueller | |
| 2018/0291854 A1 * | 10/2018 | Lopez | F02M 61/1886 |

OTHER PUBLICATIONS

Examination Report issued in corresponding application in Saudi Arabia, dated Nov. 30, 2022, with machine translation (11 pages).

* cited by examiner

*Primary Examiner* — John Kwon
*Assistant Examiner* — Johnny H Hoang
(74) *Attorney, Agent, or Firm* — Osha Bergman Watanabe & Burton LLP

(57) ABSTRACT

A fuel injector includes an injector body with a fuel chamber configured to receive fuel from a fuel line, an injector tip provided at an end of the injector body, and one or more nozzle assemblies provided in the injector tip. The one or more nozzle assemblies have a fuel channel in fluid communication with the fuel chamber, a premixing tube fluidly connected to the fuel channel, and a port fluidly connected to the premixing tube. The premixing tube has an orifice providing an outlet for the injector tip.

18 Claims, 8 Drawing Sheets

METHOD AND SYSTEMS FOR A DIRECT FUEL INJECTION INJECTOR

BACKGROUND

Direct injection may be used in engines, such as an internal combustion engine, for fuel delivery. Direct injection is a mixture formation system for engines so that fuel is injected into the combustion chamber. Direct fuel injection methods for engines uses a fuel injector mounted on a cylinder head to spray fuel directly into a combustion chamber of the engine. Direct injection fuel injectors deliver fuel during the intake and compression stroke, such that the resulting fuel-air mixing process has a major impact on the efficiency and emissions of the engine. For example, not enough mixing prior to ignition causes increased soot and oxides nitrogen emissions, while too much mixing prior to ignition causes increased unburn hydrocarbon and carbon monoxide emissions, as well as increased combustion noise at high engine load especially with compression ignition. Conventionally, increasing injection pressure has been used as a mean to promote fuel-air mixing in direct injection. However, increasing injection pressure is limited by pressure restrictions of equipment and a decrease in fuel economy. Other conventional methods inject fuel early in the compression stroke so that fuel and air have more mixing time before ignition. However, by injecting fuel early, a pressure rise rate of such mixture combustion will be too high for the compression ignition engine to operate effectively or may have pre-ignition problems under high load operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fuel injector. The fuel injector may include an injector body with a bore (e.g., a fuel chamber configured to received fuel from a fuel line); an injector tip at an end of the injector body; and one or more nozzle assemblies provided in the injector tip. The one or more nozzle assemblies may include a fuel channel in fluid communication with the fuel chamber; a port to an outer surface of the injector tip; and a premixing tube fluidly connected to the fuel channel and the port. The premixing tube may include an orifice providing an outlet for the injector tip.

In another aspect, embodiments disclosed herein relate to a combustion system. The combustion system may include an engine block with a cylinder; a piston configured to move up and down inside a main chamber of the cylinder; and a fuel injector mounted to the engine block and in fluid communication with the main chamber. The fuel injector may include an injector tip of the injector body in fluid communication with the main chamber and one or more nozzle assemblies provided in the injector tip. The one or more nozzle assemblies may include a fuel channel in fluid communication with a fuel chamber; a port in fluid communication with the main chamber; and a premixing tube configured to receive fuel from the fuel channel and air from the port. The premixing tube may mix the fuel and the air to form an air-fuel premixed fuel. The fuel injector may then inject the air-fuel premixed fuel into the main chamber.

In yet another aspect, embodiments disclosed herein relate to a method that includes spraying fuel into a premixing tube of a fuel injector from a fuel chamber of the fuel injector via a fuel channel; drawing in air into the premixing tube via a port of the fuel injector, wherein the air enters the port from a main chamber of an engine block; mixing the fuel and the air within the premixing tube to form an air-fuel premixed fuel; obtaining a mixture ratio measurement of the air-fuel premixed fuel; and injecting the air-fuel premixed fuel into the main chamber from the premixing tube.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
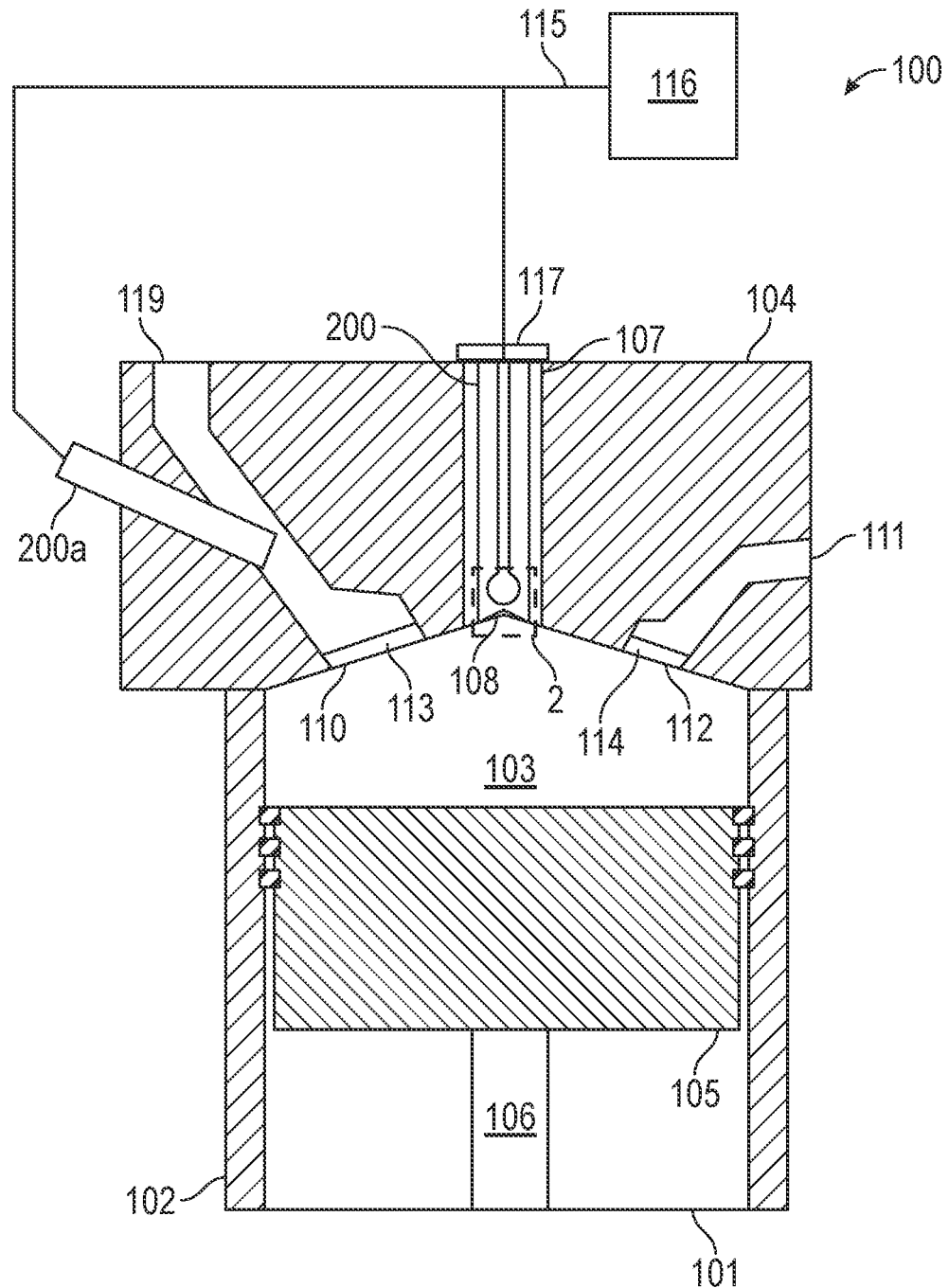
FIG. 1 is a cross-sectional diagram of a combustion system in accordance with embodiments disclosed herein.

In the following detailed description, certain specific details are set forth to provide a thorough understanding of various disclosed implementations and embodiments. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures. As used herein, the term "coupled" or "coupled to" or "connected" or "connected to" "attached" or "attached to" may indicate establishing either a direct or indirect connection and is not limited to either unless expressly referenced as such. As used herein, fluids may refer to slurries, liquids, gases, and/or mixtures thereof.

Embodiments disclosed herein are directed to a fuel injector for engines such as an internal combustion engine. More specifically, embodiments disclosed herein are directed to a fuel injector for directly injecting an air-fuel premixed fuel into a combustion chamber of an internal combustion engine. The fuel injector may draw high temperature and high-pressure air from the combustion chamber when fuel is injected. The different embodiments described herein may provide a fuel injector with an injector body having at least one mixing chamber allowing fuel (e.g., gasoline or diesel) and gas (e.g., hot air) to be mixed prior to delivery to the combustion chamber. A mixing chamber may be premixing tubes integrated and built into an injector tip of the fuel injector.

In accordance with one or more embodiments, a fuel injector includes one or more nozzle assemblies. Each nozzle assembly may include a fuel channel, a premixing tube, and a port. The premixing tube may be used mix a fuel and air before injection into a combustion chamber of an internal combustion engine. In one or more embodiments, at least one premixing tube may be built into an injector tip of the fuel injector. Additionally, the fuel channel may feed fuel from a fuel chamber or tank into the premixing tube. Further, the port may be provided in an injector body of the fuel injector. The port may draw in air from an injection port of an interfacing chamber to mix with the fuel in the premixing tube to form an air-fuel premixed fuel. From the injector tip, the air-fuel premixed fuel may be injected into a combustion chamber of the internal combustion engine. In some embodiments, a control system, such as a computing system coupled to a controller (e.g., a processor), may be coupled to the fuel injector to control an operation of the fuel injector. The control system may include instructions or commands to operate the fuel injector automatically or a user may manually control the control system at a user interface.

Conventional injection methods in the automobile industry typically requires costly equipment with an extensive layout and arrangement of pipes along the engine. Such conventional injection methods may also be more expensive because of the higher number of parts and components along with design and installation costs. Additionally, conventional injection methods lead to clogged fuel systems and engine carbon buildup that result in decrease engine performance, increased fuel consumption, a loss of power, and the need for expensive repairs.

Advantageously, using the fuel injector disclosed herein for direct air-fuel premixed fuel injection operations, emissions from the combustion chamber may be dramatically reduced compared to conventionally used fuel injectors. Further, a configuration and arrangement of the fuel injector to directly inject an air-fuel premixed fuel into an internal combustion engine according to one or more embodiments described herein may provide a cost-effective alternative to conventional injection systems while providing lower emissions. For example, one or more embodiments described herein may control the amount of air-fuel premixed fuel injected in the combustion chamber so that a progression of chemical energy available in the combustion chamber is controlled and a pressure rise rate of the engine may be controlled. Overall, the fuel injector may minimize product engineering, risk associated with engine repairs, reduction of assembly time, hardware cost reduction, and weight and envelope reduction. Thus, the disclosed fluid injection methods using the fuel injector disclosed herein improves performance, decrease emissions, and reduces cost associated with conventional fluid injection operations in internal combustion engine. Embodiments are described herein merely as examples of useful applications, which are not limited to any specific details of the embodiments herein.

Referring to FIG. 1, a combustion system 100 in accordance with embodiments disclosed herein is illustrated. The combustion system 100 may be an internal combustion engine including at least one cylinder 101 formed within an engine body or engine block 102. In FIG. 1, only a portion of the engine block is shown, and only one cylinder in the engine block is shown, although an engine block may have several cylinders. The cylinder 101 may include a main chamber 103. The main chamber 103 may be a combustion chamber of the combustion system 100. Additionally, a cylinder head 104 may be mounted at a top of the cylinder 101 and forms an upper end of the main chamber 103. A piston 105 may be arranged inside the cylinder 101 and forms a lower end of the main chamber 103. The piston 105 moves up and down inside the cylinder 101 during an engine cycle, and the volume of the main chamber 103 changes with the position of the piston 105. Further, the piston 105 may be connected to a crankshaft (not shown) by a connecting rod 106. The crankshaft may convert the reciprocating motion of the piston 105 into rotary motion, as is well known in the art.

In one or more embodiments, the cylinder head 104 may include a tunnel 107 terminating at an injection port 108 of the main chamber 103. A fuel injector 200 according to embodiments of the present disclosure, as described in FIGS. 2-7, may be mounted in the cylinder head 104 via the tunnel 107. A clamp 117 may removably fix the fuel injector 200 to the cylinder head 104. The clamp 117 may be disposed on a top of the fuel injector 200 and be attached to the cylinder head 104 to maintain a position of the fuel injector 200 in the tunnel 107. The fuel injector 200 may be aligned and coaxial or angled with respect to a cylinder axis of the cylinder head 104. In one example, installation of the fuel injector 200 to the cylinder head 104 includes forming one or more nozzle assemblies. Each nozzle assembly may include a fuel channel, a premixing tube, and a port formed inside a tip of the fuel injector 200, as described in detail below. The fuel injector 200 may be inserted into the tunnel 107, and a threaded connection or snap-fit may be made between the fuel injector 200 and the injection port 108 of the main chamber 103, such that the one or more nozzle assemblies may be in a position where an orifice of the premixing tube(s) are in fluid communication to the main chamber 103. With the fuel injector 200 installed, the fuel injector 200 may be used for a compression ignition operation in the engine block 102 such that there is no spark plug or external ignition device. The compression ignition operation allows for fuel to auto ignite when a cylinder pressure and temperature during compression exceeds an autoignition threshold of the fuel.

Still referring to FIG. 1, the cylinder head 104 may optionally include a second fuel injector 200a used in combination with the fuel injector 200. As shown, the cylinder head 104 may include at least one intake passage 119 terminating in a second intake port 110. A second fuel injector 200a may be positioned within the intake passage 119. The second fuel injector 200a may be a similar fuel injector as the fuel injector 200. The cylinder head 104 may include at least one exhaust passage 111 having in an exhaust port 112. Additionally, an intake port 110 may include an intake valve 113 to control opening and closing of the intake port 110. Air may be drawn into the injector 200 when the injector 200 is injecting fuel. Although not shown, the main chamber 103 and the intake passage 119 may be connected to a source of air in a conventional manner. The air in the main chamber 103 and the intake passage 119 may be ambient air or a mixture of ambient air and recirculated exhaust gases. An exhaust valve 114 may be arranged to control opening and closing of the exhaust port 112. When the exhaust port 112 is open, exhaust gases can be pushed out of the main chamber 103 into the exhaust passage 111. A tunnel 107, an intake passage 119, an exhaust passage 111 and associated components (e.g., valves 113, 114 and fuel injectors 200, 200a) may be provided in the cylinder head 104 for each cylinder in the combustion system 100, such as in the arrangement shown in FIG. 1 for the cylinder 101.

In one or more embodiments, the fuel injector(s) 200, 200a may be used to directly inject a mixture of fuel and air into the main chamber 103. The air flowing through the main chamber 103 and the intake passage 119 may be drawn into the premixing tube of each nozzle assembly via the port of each nozzle assembly. Additionally, fuel may enter the premixing tube of each nozzle assembly via the fuel channel of each nozzle assembly. In the premixing tube, the air and fuel may mix forming an air-fuel premixed fuel to be delivered, via injection, to the main chamber 103. In one example, the air-fuel premixed fuel may have an air to fuel ratio equal to or more than 2 such that the air-fuel premixed fuel is lean for lower emissions. The fuel injector(s) 200, 200a may be fluidly connected to a fuel line 115, which is in communication with a fuel supply 116. A control system, such as an engine control unit, may control an opening and closing of the fuel injector(s) 200, 200a to deliver the air-fuel premixed fuel into the main chamber 103 at desired times during an engine cycle.

In some embodiments, a cable (not shown), such as an electrical or hydraulic power cable, may be coupled the fuel injector(s) 200, 200a. The cable may provide power to the fuel injector(s) 200, 200a from a power source (not shown). Additionally, the cable may be connected to a control system such a panel (e.g., switchboards/user interface) having a computing system coupled to a controller (e.g., a processor) to control the fuel injector(s) 200, 200a. The control system may include instructions or commands to operate the fuel injector(s) 200, 200a automatically or a user may manually control the control system at the panel. It is further envisioned control system may be connected to an office via a satellite such that a user may remote monitor conditions and send commands to the fuel injector(s) 200, 200a. If leaks and performance issues are found, an alert may be sent to the control system to adjust or turn off the fuel injector(s) 200, 200a manually or automatically.

Figure 2A:
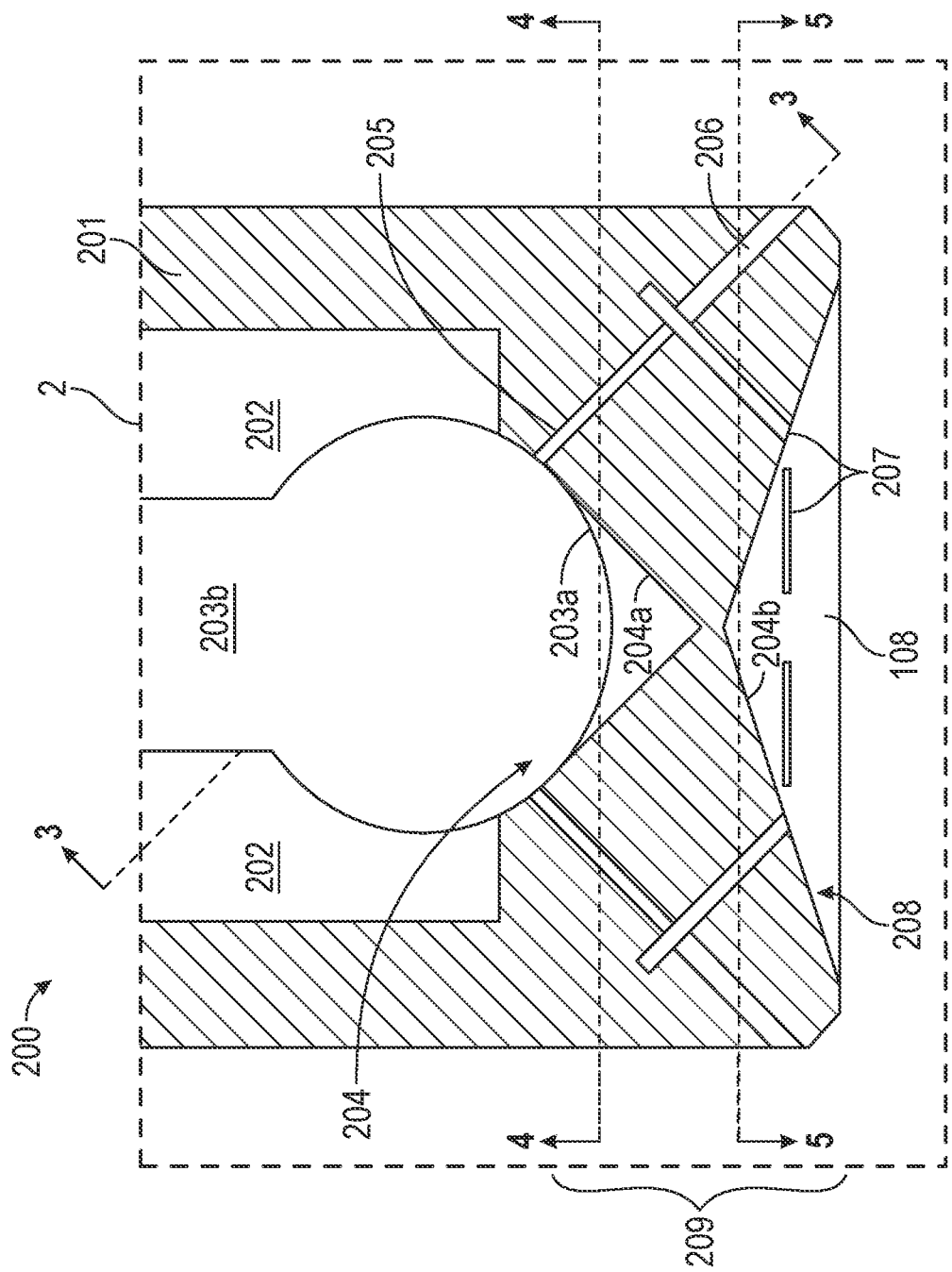
FIG. 2A is a close-up cross-sectional diagram of a fuel injector of FIG. 1 in accordance with embodiments disclosed herein.

Now referring to FIG. 2A, a close-up of the fuel injector 200 taken from the dashed box 2 of FIG. 1 is illustrated. More specifically, the dashed box 2 shows an injection end of the fuel injector 200, including a tip 208 of the fuel injector 200 in accordance with embodiments disclosed herein.

The fuel injector 200 may include an injector body 201 having a fuel chamber 202 formed therein. The fuel chamber 202 may be a bore formed in the injector body 201. The fuel chamber 202 may be fluidly coupled to the fuel line (see 115 in FIG. 1) such that the fuel supply (see 116 in FIG. 1) may feed fuel into the fuel chamber 202. Additionally, at an end distal from the fuel supply, the fuel chamber 202 may have a conical end 204. The conical end 204 may include an inner conical surface 204a. Further, a needle ball (203a, 203b) may be provided within the fuel chamber 202, where fuel may be provided in the annulus formed between the fuel chamber bore and the needle ball. The needle ball may include a ball end 203a attached to a rod 203b. The ball end 203a may be adjacent to the conical end 204 such that the ball end 203a may be fitted within the inner conical surface 204a. When the needle ball (203a, 203b) is moved axially relative to the inner conical surface 204a, the amount of fuel flowing from the fuel chamber 202 into the conical end 204 may be varied.

Figure 2B:
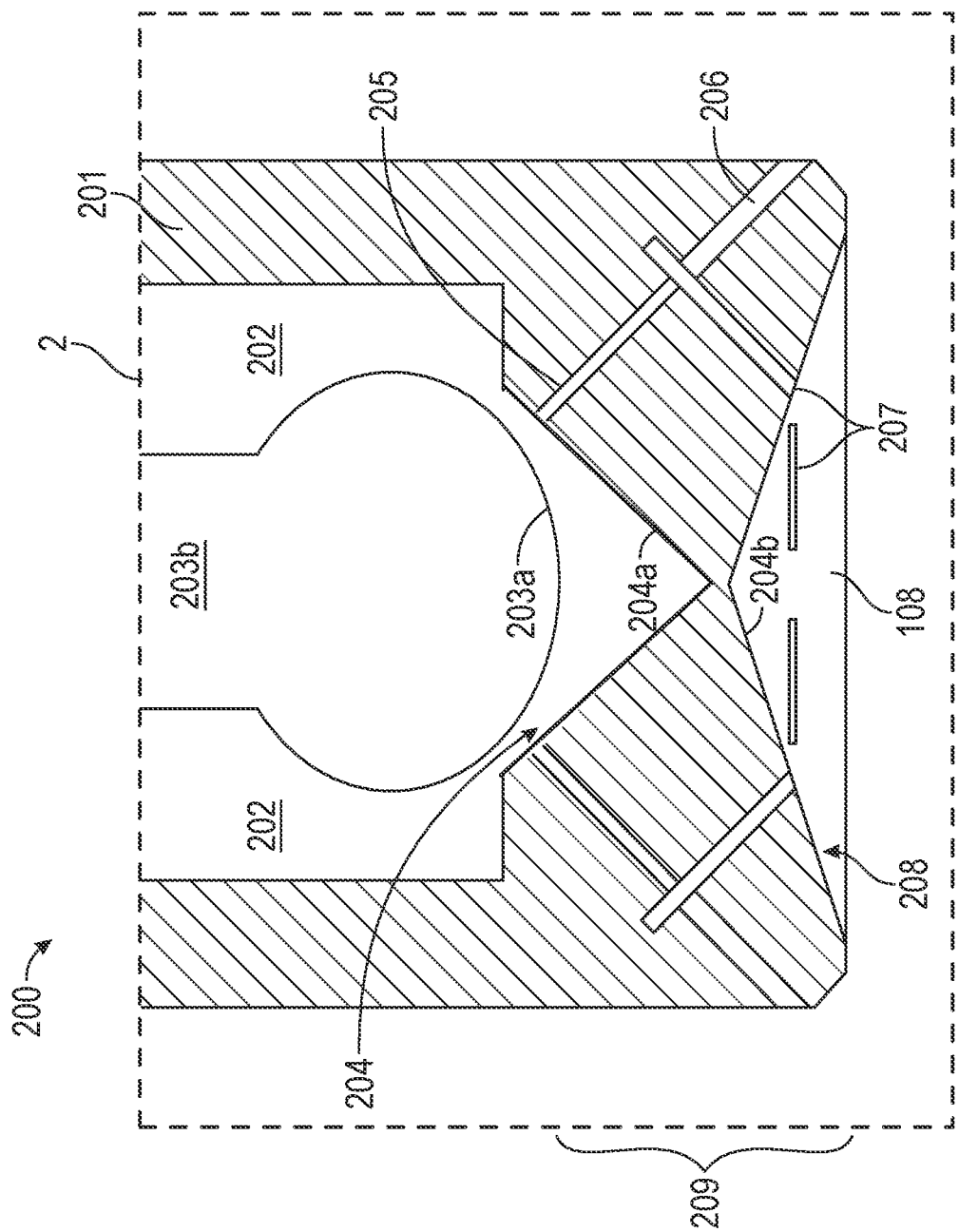
FIG. 2B is a close-up cross-sectional diagram of the fuel injector of FIG. 1 in accordance with embodiments disclosed herein.

As shown in FIG. 2A, the needle ball (203a, 203b) may be in a closed position, where a perimeter of the ball end 203a contacts an entire inner diameter of the inner conical surface 204a. In the closed position, the ball end 203a may seal the conical end 204, such that no fuel from the fuel chamber 202 enters the conical end 204. In FIG. 2B, the needle ball (203a, 203b) is illustrated in an open position. In the open position, the ball end 203a may be axially spaced apart from the inner conical surface 204a such that fuel from the fuel chamber 202 enters the conical end 204. In some embodiments, the fuel injector 200 may be calibrated to automatically move the needle ball (203a, 203b) back and forth from the closed position to the open position to allow a calibrated amount fuel into the conical end 204.

Still referring to FIG. 2A, in one or more embodiments, one or more nozzle assemblies 209 of the fuel injector 200 may be formed around the conical end 204 of the tip 208. Each nozzle assembly 209 may include a fuel channel 205, a premixing tube 206, and a port 207 formed within the injector body 201. The fuel channel 205 may be provided in the injector body 201 extending from the fuel chamber 202. The fuel channel 205 may fluidly couple the fuel chamber 202 to the premixing tube 206 provided in the injector body 201. In some embodiments, the fuel channel 205 may be coaxial with the premixing tube 206. The port 207 may extend from the outer surface 204b of the tip 208 through the injector body 201 to the premixing tub 206. In some embodiments, the port 207 may intersect the premixing tube 206 at substantially the same location that the fuel channel 205 intersects the premixing tube 206. When the outer surface 204b of the tip 208 is interfacing the main chamber of an engine cylinder, the port may allow air from the main chamber (see 103 FIG. 1) to enter the premixing tube 206.

From the port 207 and the fuel channel 205, air and fuel may mix within the premixing tube 206 to form an air-fuel premixed fuel. With the air-fuel premixed fuel formed, an end of the premixing tube 206 may be an orifice for the air-fuel premixed fuel to exit the premixing tube 206 and be injected into the main chamber of a cylinder (see 101 in FIG. 1). The orifice may be a valve covered orifice to control the amount of injected air-fuel premixed fuel, e.g., to prevent any additional air-fuel premixed fuel dripping into the main chamber from the premixing tube 206 after injection operations to avoid particulate emissions.

According to embodiments of the present disclosure, the orifice of a premixing tube 206 may be formed around an outer circumference of the injection end of the fuel injector 200, such that the premixing tube(s) 206 extend from fuel channel 205 and port 207 to the outer circumference of the injector body 200, as shown in FIGS. 2A and 2B. When premixing tubes 206 are formed to exit around the outer circumference of a fuel injector tip 208, the fuel injector 200 may be positioned in cylinder head tunnel (107 in FIG. 1) and injection port (108 in FIG. 1) such that the tip 208 may protrude enough into the adjacent main chamber (e.g., 101 in FIG. 1) to allow for the exiting air-fuel premixed fuel to enter into the main chamber, while preventing the internal components (e.g., the needle ball 203a, 203b) of the fuel injector 200 from protruding into the main chamber. In such embodiments, the air-fuel premixed fuel may be directed into an adjacent main chamber of a cylinder around the outer circumference of the fuel injector tip 208. In other embodiments, such as described below with reference to FIG. 6, premixing tubes 206 may exit an end 204b of the tip 208, and the end 204b of the tip 208 may be flush or aligned with the main chamber wall, such that the tip 208 does not protrude into the main chamber.

In some embodiments, each port 207 may be a flat tube (e.g., having a rectangular cross-sectional profile), which may increase heat transfer from the air coming into the premixing tube 206 during fuel injection and combustion. By increasing heat transfer, the air may be cooled to avoid autoignition from occurring in the fuel injector 200. If autoignition occurs, air and fuel may not mix as the fuel is ignited and the fuel injector 200 may be damaged. Additionally, the tip 208 of the fuel injector 200 may have a diameter large enough that each port 207 of the multiple nozzle assemblies 209 may be spaced apart from each other. By spacing the ports 207 apart from each other, the ports 207 may draw air from the injection port 108 of the main chamber (see 103 in FIG. 1) from multiple locations rather than a central location. With air drawn in from multiple locations, the fuel injector 200 may have improved air utilization in the main chamber during the injection and combustion process. Further, in some embodiments, the outer surface 204b of the injector tip 208 may have a conical shape, such as shown in FIGS. 2A and 2B, to improve air flow into the ports 207 by drawing more air into the port 207. The conical shape of the outer conical surface 204b may trap and recirculate air into the ports 207.

Figure 3:
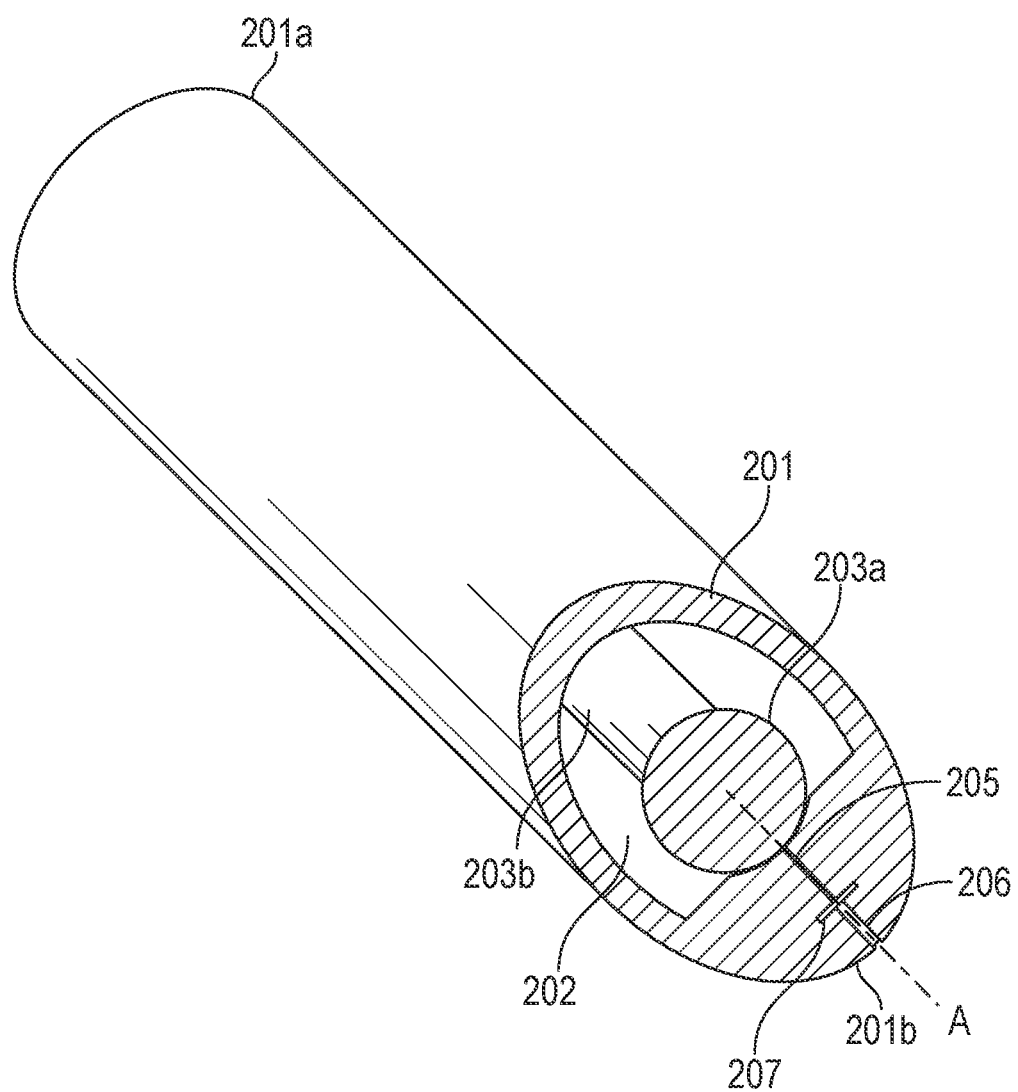
FIGS. 3-5 are various cross-sectional views of the fuel injector of FIG. 2A in accordance with embodiments disclosed herein.
Figure 4:
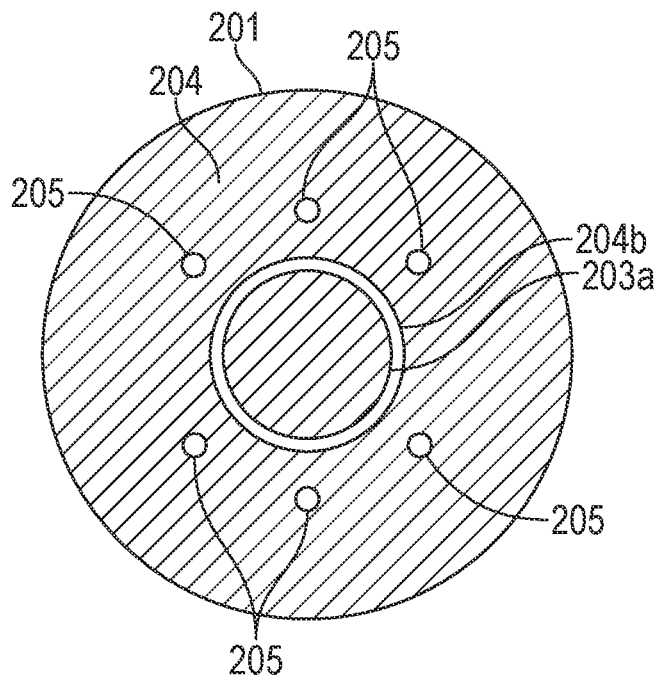
Figure 5:
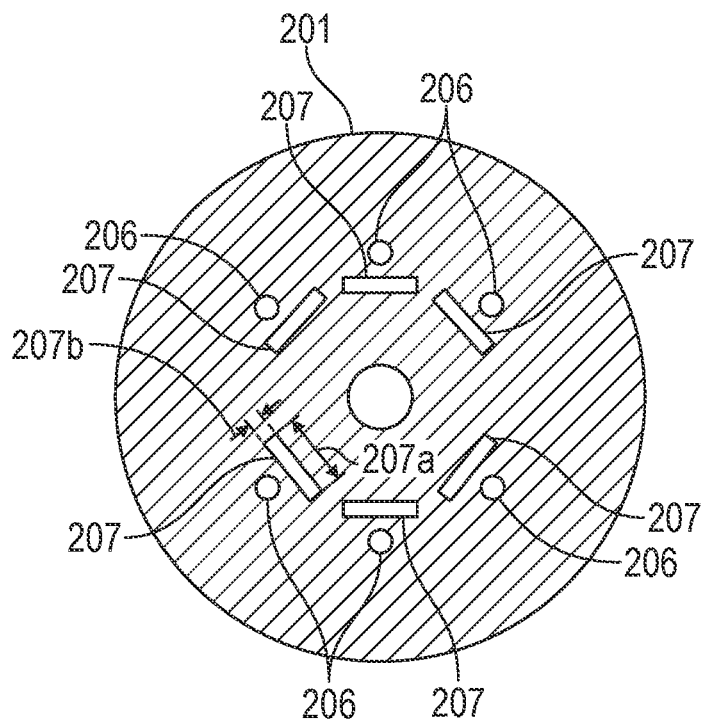

Now referring to FIGS. 3-5, various cross-sectional views of the fuel injector 200 taken from FIG. 2A are illustrated. Referring to FIG. 3, a cross-sectional view taken along dashed line 3-3 of the fuel injector 200 from FIG. 2A is illustrated. The injector body 201 may be a cylinder extending axially from a distal end 201a to a nozzle end 201b. The fuel chamber 202 may be formed from a bore within the injector body 201. Further, the injector body 201 may insulate the fuel chamber 202. In one or more embodiments, the fuel channel 205 and the premixing tube 206 may be coaxial about an axis A. The axis A may be angled from the fuel chamber 202 central axis. Further, the port 207 may be perpendicular (or other angle) to the axis A.

Referring to FIG. 4, a cross-sectional view taken along dashed line 4-4 of the fuel injector 200 from FIG. 2A is illustrated. The injector body 201 may have a circular cross-sectional profile. Additionally, each of the fuel channels 205 may have a cylindrical shape. As shown, the needle ball 203a may be centered in the injector tip cone 204a. Referring to FIG. 5, a cross-sectional view taken along dashed line 5-5 of the fuel injector 200 from FIG. 2A is illustrated. Each of the ports 207 may be flat tubes that intersect the premixing tubes 206. The ports 207 may have a generally rectangular cross-sectional profile, including a width 207a and a thickness 207b. Further, each of the premixing tubes 206 may have a generally cylindrical shape.

Figure 6:
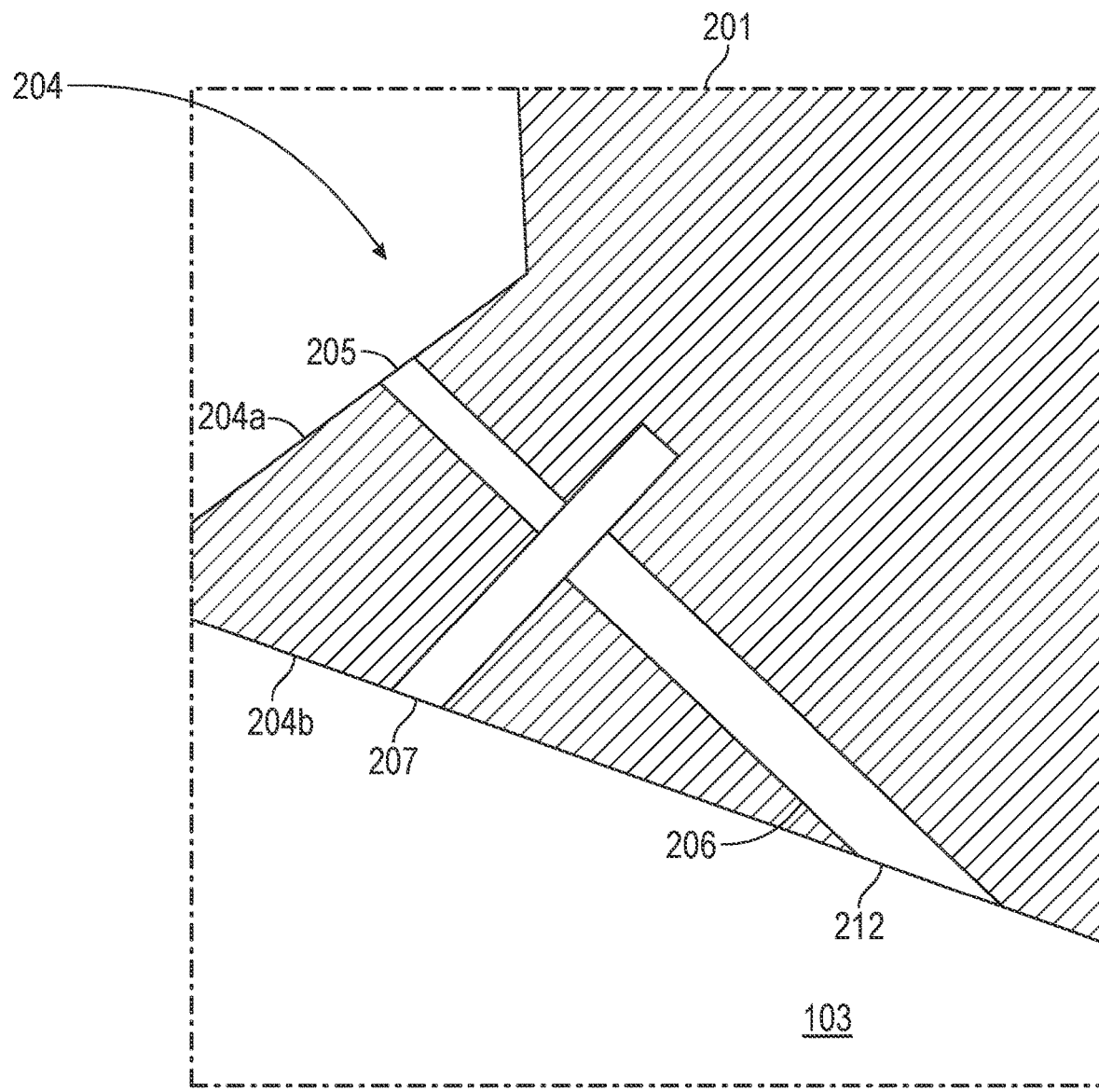
FIG. 6 is a schematic diagram of a fuel injector of in accordance with embodiments disclosed herein.

Now referring to FIG. 6, a close-up of a premixing tube 206 is illustrated. The premixing tube 206 may extend outwardly from the port 207 and the fuel channel 205 to exit at an end 204b surface of the fuel injector tip. In such embodiments, the tip 208 of the fuel injector 200 may be flush or aligned with the injection port (108 in FIG. 1) formed in the main chamber (103 in FIG. 1), such that internal components of the fuel injector 200 do not protrude into the main chamber 103 (as shown in FIG. 1). By not extending into the main chamber, heat transfer from the fuel injector 200 to the cylinder head (104 in FIG. 1) may be improved, which may reduce the temperature of the fuel injector 200, and thus reduce the chance of having an autoignition event occur therein.

In a non-limiting example, the premixing tube 206 may have a diameter larger than a diameter of the fuel channel 205 and a thickness of the port 207. Additionally, the thickness of the port 207 may be larger than the diameter of the fuel channel 205. By having the premixing tube 206 larger than the fuel channel 205 and the port 207, the increased diameter creates a low-pressure wake zone so that air may be drawn into the fuel flow; then, mixing naturally occurs from high velocity fuel and air flow meeting in the premixing tube 206. Further, with fuel pressure higher than gas pressure in chamber 103 and flow direction of fuel in 205, the premixing tube 206 may prevent flow back into the fuel channel 205 and the port 207.

In one or more embodiments, air being drawn into the premixing tube 206 may be controlled by a fuel pressure from fuel entering the premixing tube 206. Additionally, the ball end (see 203a in FIG. 2A) of the needle ball may control the fuel entering the fuel channel 205 and stop a dripping of the fuel from the conical end 204. For example, the ball end of needle ball may be flush against the inner conical surface 204a to stop fuel from entering the fuel channel 205. By controlling fuel pressure, a velocity of the fuel flow in the fuel channel 205 may be affected to create a low-pressure zone in an intersection between the fuel channel 205, the premixing tube 206, and the port 207. The premixing tube 206 may extend from an intersection between the fuel channel 205 and the port 207 to terminate at an orifice 212 flush with the outer conical surface 204b, which may interface with the main chamber 103 in an engine cylinder. From the premixing tube 206, the air-fuel premixed fuel may be injected into the main chamber 103 through the orifice 212.

Figure 7:
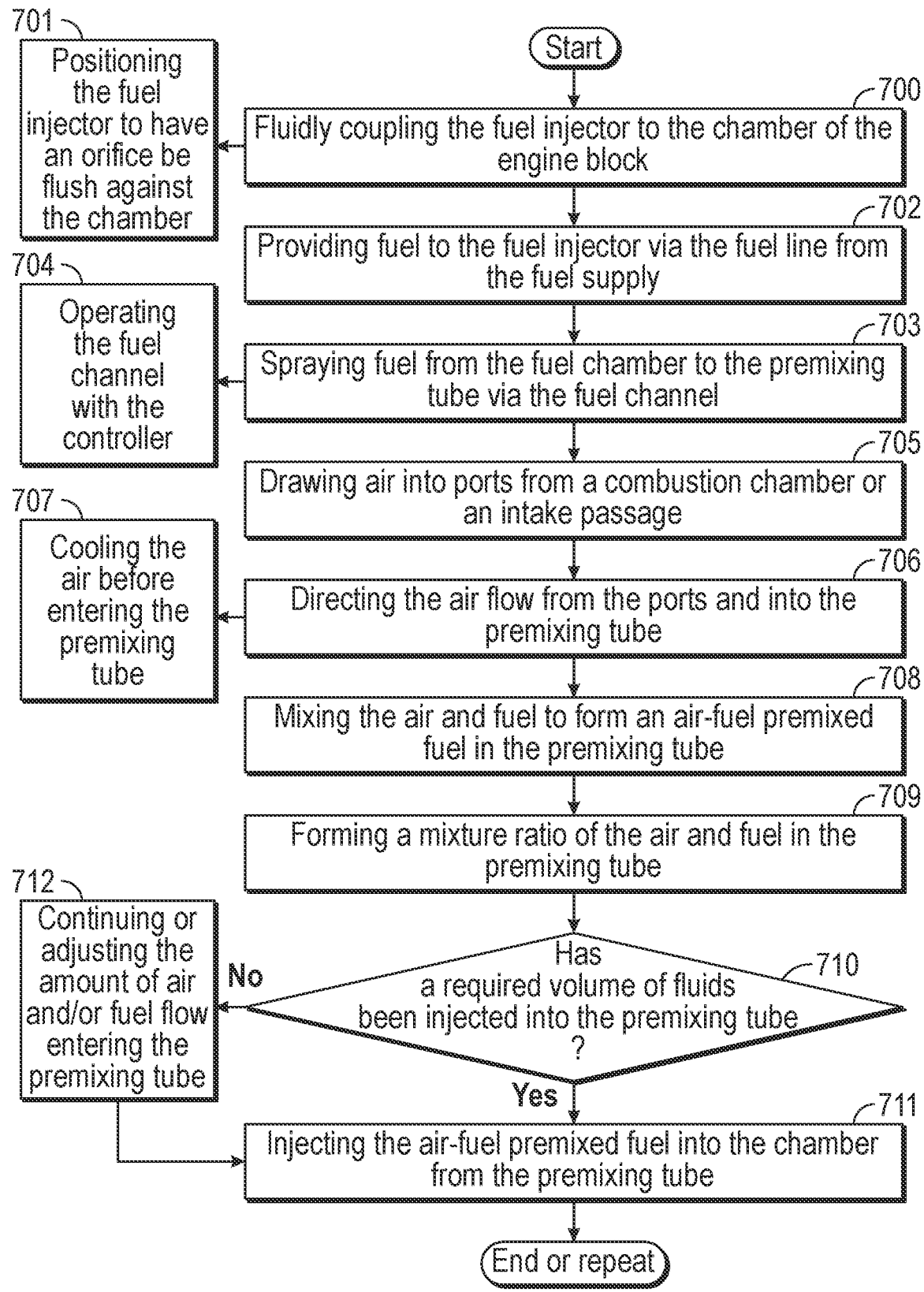
FIG. 7 is a flow chart of a method in accordance with embodiments disclosed herein.

FIG. 7 is a flowchart showing a method of a fluid injection using the fuel injector 200 of FIGS. 1-6. One or more blocks in FIG. 7 may be performed by one or more components (e.g., a computing system coupled to a controller in communication with the fuel injector 200) as described in FIGS. 1-6. For example, a non-transitory computer readable medium may store instructions on a memory coupled to a processor such that the instructions include functionality for operating the fuel injector 200. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, a fuel injector is fluidly coupled a combustion chamber of the engine block. The fuel injector may be clamped to the body of the engine block, for example. Additionally, the method includes positioning the fuel injector to have an orifice of each premixing tube be flush against the combustion chamber such that the premixing tube does not extend into the combustion chamber, as shown in Block 701. In Block 702, with the fuel injector in place, the fuel line may provide fuel from a fuel supply to the fuel injector. Additionally, the fuel enters the fuel chamber of the fuel injector directly from the fuel line. In Block 703, with fuel in the fuel chamber, fuel is sprayed from the fuel chamber through a fuel channel of the fuel injector into the premixing tube. In addition, the controller may include controls or commands to operate the amount of fuel and when the fuel is being sprayed through the fuel channel via a needle ball, as shown in Block 704. For example, the needle ball may axially move back and forth to control the amount of fuel leaving the fuel chamber. It is further envisioned that the needle ball may stop a dripping of the fuel.

In Block 705, air may be drawn in the ports via a conical shape of the combustion chamber or an injection port. The conical shape of the combustion chamber may trap and recirculate air into the ports. From the ports, the air flow may be directed into the premixing tube, as shown in Block 706. Additionally, the combustion chamber or the intake passage may have a conical shape at the ports to provide better air flow and utilization for the ports. Further, when the ports are flat tubes, the air may be cooled before entering the premixing tube, as shown in Block 707. In Block 708, with the air being directed into the premixing tube and the fuel being spraying into the premixing tube, the air and fuel may mix to form an air-fuel premixed fuel in the premixing tube. In some embodiments, the premixing tube may have internal conduits to control a mixing of the air and the fuel. The air-fuel premixed fuel may have an air to fuel ratio equal to or more than 2, such that the air-fuel premixed fuel is lean for lower emissions.

In Block 709, a mixture ratio of the air and fuel in the premixing tube may be formed to a value equal to or more than 2 such that the air-fuel premixed fuel is lean for lower emissions. Based on a calibration of the engine block, the controller may determine if a required volume of fluids has been injected into the premixing tube to form the air-fuel premixed fuel at the mixture ratio, as shown in Block 710. For example, using the mixture ratio measurement, an amount of air and fuel being injected into the premixing tube from the port and the fuel channel of the fuel injector may be determined. If the required volume of fluids has been reached, the controller may proceed to instruct the fuel injector to inject the air-fuel premixed fuel into the combustion chamber from the premixing tube, as shown in Block 711, such that the engine may perform combustion operations. However, if the required volume of fluids has not been reached, in Block 712, the controller may continue or adjust the amount of air and/or fuel flow entering the premixing tube until the mixture ratio reaches the desired requirement. For example, the controller may adjust a suction rate or spray rate of the fuel injector to suck air into the ports or spraying fuel through the fuel channel.

Figure 8:
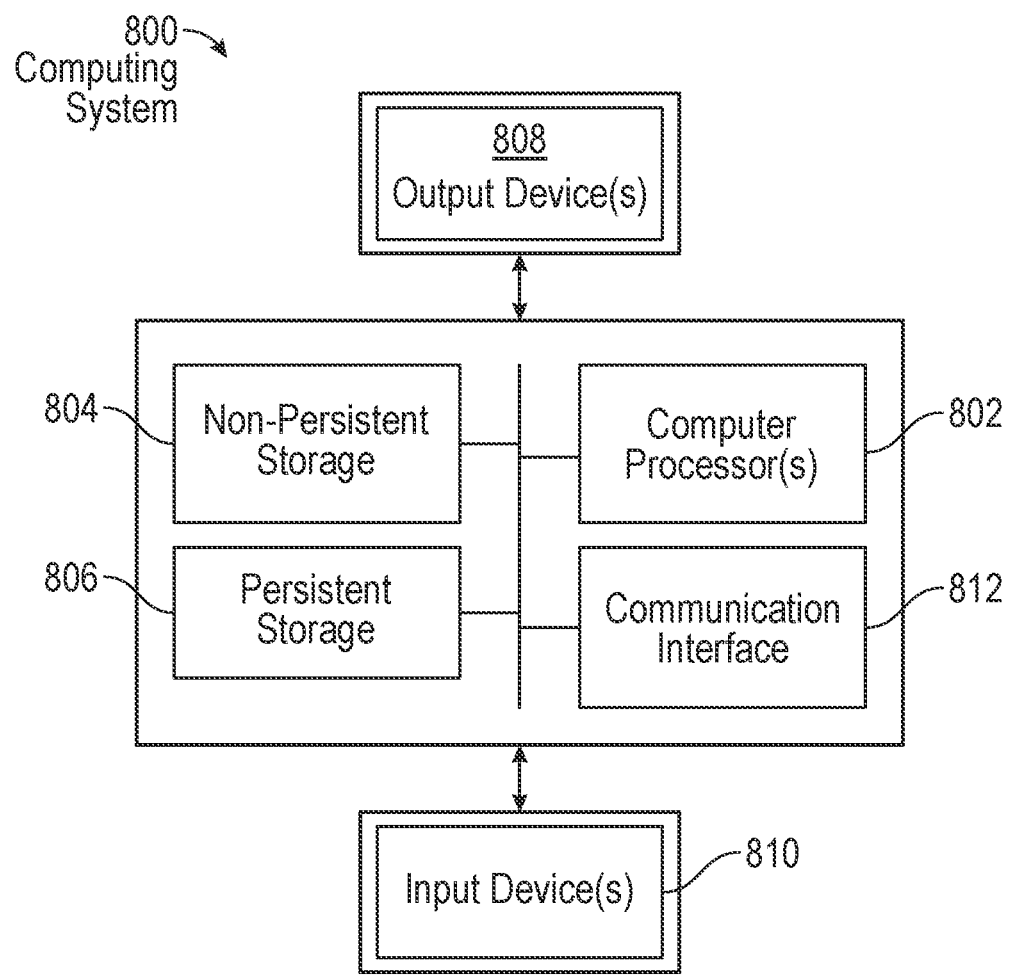
FIG. 8 is a schematic diagram of a computing system in accordance with embodiments disclosed herein.

Implementations herein for operating the fuel injector 200 may be implemented on a computing system coupled to a controller in communication with the various components of the fuel injector 200. Any combination of mobile, desktop, server, router, switch, embedded device, or other types of hardware may be used with the submersible pump system 800. For example, as shown in FIG. 8, the computing system 800 may include one or more computer processors 802, non-persistent storage 804 (e.g., volatile memory, such as random access memory (RAM), cache memory), persistent storage 806 (e.g., a hard disk, an optical drive such as a compact disk (CD) drive or digital versatile disk (DVD) drive, a flash memory, etc.), a communication interface 812 (e.g., Bluetooth interface, infrared interface, network interface, optical interface, etc.), and numerous other elements and functionalities. It is further envisioned that software instructions in a form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. For example, the software instructions may correspond to computer readable program code that, when executed by a processor(s), is configured to perform one or more embodiments of the disclosure.

The computing system 800 may also include one or more input devices 810, such as a touchscreen, keyboard, mouse, microphone, touchpad, electronic pen, or any other type of input device. Additionally, the computing system 800 may include one or more output devices 808, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 802, non-persistent storage 804, and persistent storage 806. Many different types of computing systems exist, and the input and output device(s) may take other forms.

The computing system 800 of FIG. 8 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. For example, a GUI may first obtain a notification from a software application requesting that a particular data object be presented within the GUI. Next, the GUI may determine a data object type associated with the data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the data object and render a visual representation of the data values within a display device according to the designated rules for that data object type.

Data may also be presented through various audio methods. Data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

While the method and apparatus have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:
1. A fuel injector, the fuel injector comprising:
an injector body with a bore, wherein the bore is a fuel chamber configured to received fuel from a fuel line;
an injector tip at an end of the injector body;
one or more nozzle assemblies provided in the injector tip, wherein each of the one or more nozzle assemblies comprises:
 a fuel channel in fluid communication with the fuel chamber, wherein the fuel channel extends from an inner surface of a conical end of the fuel chamber;
 a premixing tube fluidly connected to the fuel channel; and
 a port extending from an outer surface of the injector tip to the premixing tube, wherein at the outer surface of the injector tip, the port comprises an inlet for air, wherein the premixing tube comprises an orifice at an end distal to the port, wherein the orifice is an outlet for the injector tip; and a needle ball movably disposed in the bore, wherein the needle ball has a closed position and an open position, and wherein in the closed position, the needle ball contacts and seals the conical end of the fuel chamber to stop a dripping of a fuel.

2. The fuel injector of claim 1, wherein the port is a flat tube.

3. The fuel injector of claim 1, wherein the fuel channel and the premixing tube are coaxial.

4. The fuel injector of claim 3, wherein the port extends perpendicularly from the premixing tube.

5. The fuel injector of claim 1, wherein the injector tip is cylindrical.

6. The fuel injector of claim 5, wherein the outer surface has a conical shape.

7. The fuel injector of claim 1, wherein the premixing tube has a diameter larger than a diameter of the fuel channel and a thickness of the port.

8. A combustion system comprising:
an engine block with a cylinder;
a piston configured to move up and down inside a main chamber of the cylinder; and
a fuel injector mounted to the engine block and in fluid communication with the main chamber, the fuel injector comprising:
    an injector tip of the injector body in fluid communication with the main chamber, wherein the injector tip has a conical outer surface;
    one or more nozzle assemblies provided in the injector tip, wherein each of the one or more nozzle assemblies comprises:
        a fuel channel in fluid communication with a fuel chamber;
        a port opening at an inlet formed along the conical outer surface of the injector tip to be in fluid communication with the main chamber; and
        a premixing tube configured to receive fuel from the fuel channel and air from the port, wherein the premixing tube mixes the fuel and the air to form an air-fuel premixed fuel, and wherein the premixing tube comprises an orifice providing an outlet for the injector tip; and
    a needle ball movably disposed in the bore, wherein the needle ball has a closed position and an open position, and wherein in the closed position, the needle ball contacts and seals a conical end of the fuel chamber to stop a dripping of a fuel,
wherein the fuel injector injects the air-fuel premixed fuel into the main chamber.

9. The combustion system of claim 8, wherein the orifices of the one or more nozzle assemblies are in fluid communication with the main chamber to inject the air-fuel premixed fuel into the cylinder.

10. The combustion system of claim 8, wherein a cylinder head of the cylinder comprises a tunnel to receive the fuel injector.

11. The combustion system of claim 10, further comprising a second fuel injector positioned in an intake passage of the cylinder head configured to inject an air-fuel premixed fuel into the main chamber.

12. The combustion system of claim 11, wherein the fuel injector and the second fuel injector are connected to a fuel line to deliver fuel from a fuel supply.

13. The combustion system of claim 11, further comprising a control system configured to control injection rate of the fuel injector and the second fuel injector to deliver the air-fuel premixed fuel into the main chamber.

14. A method comprising:
spraying fuel into a premixing tube of a fuel injector from a fuel chamber of the fuel injector via a fuel channel extending from an inner surface of a conical end of the fuel chamber;
drawing in air into the premixing tube via a port of the fuel injector, the port extending from an inlet formed at an outer surface of a fuel injector tip to the premixing tube, wherein the air enters the inlet of the port from a main chamber of an engine block;
mixing the fuel and the air within the premixing tube to form an air-fuel premixed fuel;
injecting the air-fuel premixed fuel into the main chamber from an orifice of the premixing tube, wherein the orifice provides an outlet of the fuel injector tip;
controlling the spraying fuel into the premixing tube via a needle ball disposed in the fuel chamber; and
stopping a dripping of the fuel by moving the needle ball to contact and seal the conical end of the fuel chamber.

15. The method of claim 14, further comprising:
forming an air to fuel mixture ratio of the air-fuel premixed fuel equal to or more than 2.

16. The method of claim 14, further comprising:
trapping and recirculating the air into the port via a conical shape of the outer surface of the fuel injector tip.

17. The method of claim 16, further comprising:
cooling the air in the port before the air enters the premixing tube.

18. The method of claim 14, wherein drawing in air is at least partially performed by providing the premixing tube with a diameter larger than a diameter of the fuel channel and larger than a thickness of the port to create a low-pressure wake zone in the premixing tube.

* * * * *